Feb. 3, 1931.  J. AMON  1,790,639
AUTOMATIC LUBRICATING SYSTEM
Filed Aug. 26, 1926  2 Sheets-Sheet 1

Inventor
Joseph Amon

Feb. 3, 1931.  J. AMON  1,790,639
AUTOMATIC LUBRICATING SYSTEM
Filed Aug. 26, 1926  2 Sheets-Sheet 2

Inventor
Joseph Amon

Patented Feb. 3, 1931

1,790,639

UNITED STATES PATENT OFFICE

JOSEPH AMON, OF FOREST HILLS, NEW YORK

AUTOMATIC LUBRICATING SYSTEM

Application filed August 26, 1926. Serial No. 131,643.

My invention relates to self controlling automatic lubricating system especially adaptable for automobiles, motorboats and all kinds of machinery.

The objects of my invention are as follows:

First: To provide a centralized lubrication system to fully automatically supply any number of lubricating points, collectively or individually.

Second: To provide a preferably centrally located common lubricant container, and suitable electrical air pressure means to force the lubricant into the various lubricating points.

Third: To provide self actuating automatic lubricant ejectors, so arranged as to perpetually charge themselves and discharge the lubricant into the lubricating points.

Fourth: To provide automatically functioning and electrically controlled signalling means to operate when the predetermined minimum quantity of lubricant is reached, and also to function in case any mechanical or electrical defects should develop in the system.

Fifth: To design and arrange the common lubricant container so as to present a self-contained, portable, dust and waterproof unit.

These and other objects I attain by the novel construction and combination of various parts and elements as fully described in this specification and illustrated in the accompanying drawings in which.

Although a high degree of perfection has been attained in the art of lubrication, especially those systems adapted in connection with automobiles, motorboats, trucks, etc. certain objectionable features are encountered which I overcome by means of an exceedingly simple and efficient system.

Figure 1:
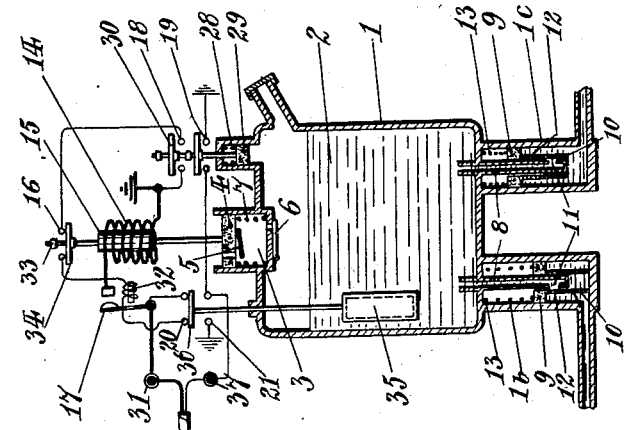
Figure 1, represents a diagrammatical arrangement of the complete system.

The features and functioning of the system will be more clearly understood by following the diagram shown in Figure 1. The system is operated by means of air pressure, maintained at a constant value at all times within a container 1. The pressure exerted upon the lubricant 2, forces the same into the automatically functioning lubricant ejectors 1c and 1b, which in turn feed the individual lubricating points.

The air pressure may be maintained by mechanical means as pumps compressors or similar arrangements, or the combination of an electric motor coupled with an air pump may be employed. These means are not only complicated and expensive but are subject to continued inspection replacements, repair and lubrication. To eliminate these objectionable features I utilize a specially designed electromagnetically operated air compressor, comprising an air compression chamber 3, a plunger 4, and suitable air valves 5 and 6, upon the plunger 4, and the air compressing chamber 3, respectively. Compression spring 7, normally tends to hold plunger 4 in its uppermost poistion. By forcing plunger 4 downward, the enclosed air in chamber 3, will be compressed, thus automatically closing valve 5 and opening valve 6, and the air will be forced into the container 1. With this operation lubricant 2 will be pressed into the ejectors 1c and 1b, schematically shown in Figure 1. The ejectors function as follows:

Ejector 1b is being shown in the discharged condition, that is the lubricant has been ejected into the supply line and is now ready for recharging. In this position the lubricant is permitted to enter by means of pipe 8, closed at the bottom but provided with a side outlet opening 11, which now corresponds with a similar opening 12 in sliding sleeve 10. Sliding sleeve 10 is rigidly joined to sliding plunger 9, who in turn is forced upward by the inrushing lubricant. This upward motion continues till opening 12 is positioned fully above opening 11 in tube 8, with this the supply of lubricant is cut off. This position is clearly shown in ejector 1c and compression spring 13 will now force, by pressure upon plunger 9, the lubricant into the supply line until the ejector is ready again for the charge, as shown in ejector 1b. A practical design of such ejectors is more fully described in connection with Figure 2, further below.

The electrical control of the system comprises the electromagnetically controlled operating mechanism for the air compressor, the electrically operated pressure control mechanism, the electrically operated liquid control mechanism, and the electrical signalling arrangement.

The electromagnetic air compressor is composed of an electric solenoid 14, a magnetic plunger 15, the lower part of which is connected to air compressor plunger 4, the upper end connects to the electrical switching contacts 16. A small electric contactor 17 serves the purpose of closing and interrupting the electric circuit of the solenoid.

The pressure control mechanism comprises a plunger 29, actuated by the air pressure within the container, the upper part of plunger connects to the electrical switching contacts 18 and 19.

The liquid control mechanism comprises a float 35 connected with contacts 20 and 21.

Assuming the air pressure reaches its lower minimum, then spring 28, will force plunger 29 downward till contacts 18 are bridged by disc 30. In this moment an electric current will pass from the positive terminal of battery 26, over switch 27, to terminals 24 and 31, contacts 20 over contactor coil 32, contacts 16, and over contacts 18 to ground and return to the negative terminal of battery 26. This circuit will energize contactor 17 which at this moment closes the main circuit of solenoid 14, and magnetic plunger 15 is pulled downward, thus operating the air compressor. At the lower limit the control circuit is interrupted at contacts 16, accomplished by collar 33 pushing contact bridge 34 out of engagement with contact 16. Contactor 17 thus being disenergized will interrupt the solenoid circuit permitting plunger 15 to return to its uppermost position thereby again closing the control circuit over contacts 16.' This operation is repeated till the normal air pressure is restored within container 1, at which moment the control circuit is finally interrupted at contacts 18 by plunger 29 being pushed upward.

Should the supply of lubricant reach the predetermined minimum then float 35 will pull contact bridge 36 out of engagement with contacts 20, and close the signalling circuit over contacts 21. The control circuit now permanently interrupted, a current passes from terminal 24, over lamp 22, terminals 25 and 37 over contacts 21, to ground. The device will now cease to function and the signal lamp continue to operate till the container is recharged with lubricant and the normal conditions restored. In case of any mechanical breakdown or defects in the electrical control resulting in the diminished air pressure within container 1, plunger 29 of pressure control will assume its lowermost position and thereby closing contacts 19, and consequently cause signal lamp 22 to function, till the defects are corrected.

From time to time it will be necessary to ascertain the functioning of the signal lamp 22, for which purpose a test switch 23, establishing a ground circuit, is provided.

Figure 2:
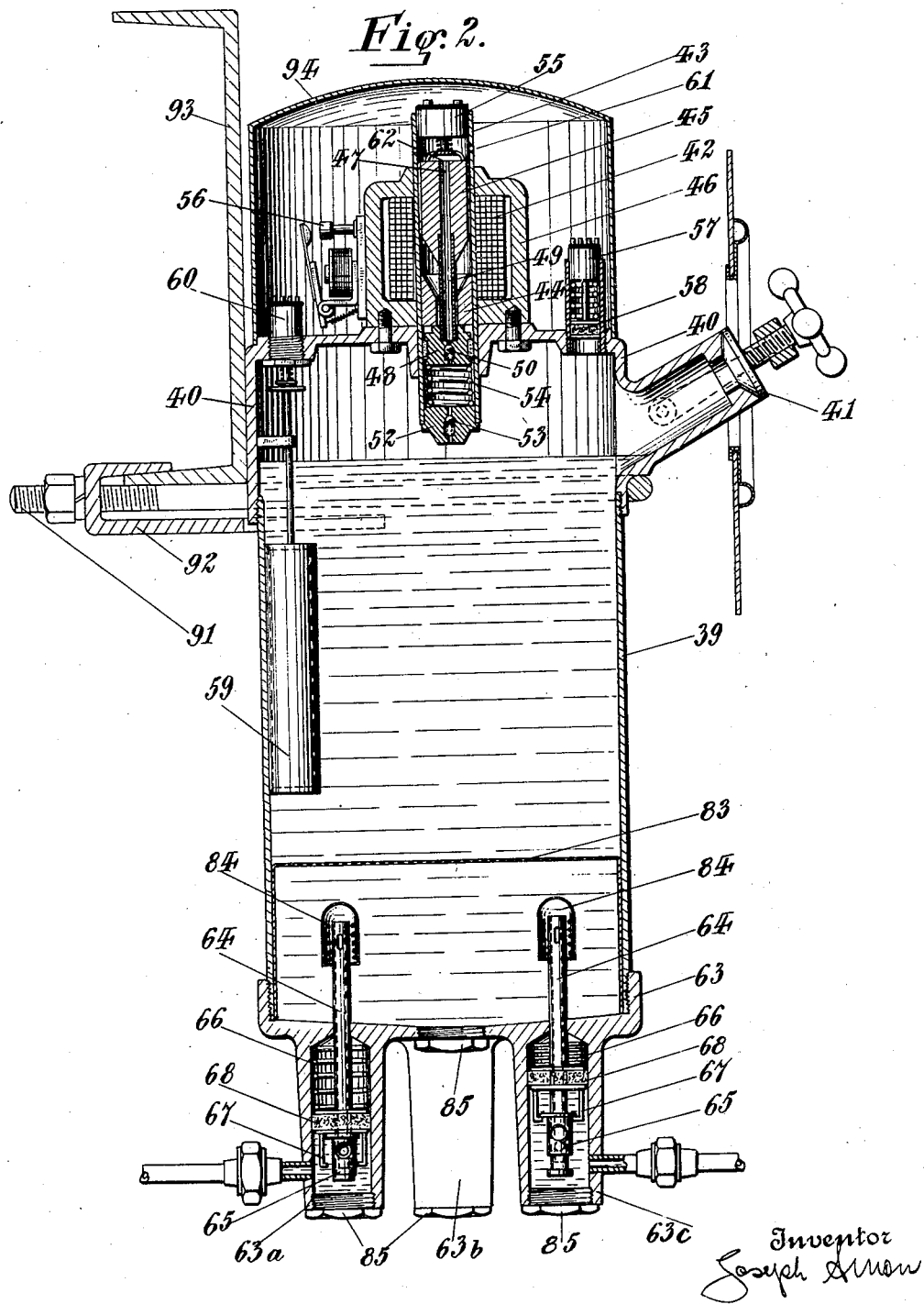
Figure 2, represents a sectional view of the preferred practical embodiment of my invention.

In Figure 2, one form of practical embodiment of this device is illustrated.

The top portion of a container 39 is intended to carry all of the control and electrical equipment, while the bottom portion connects directly with the lubricant ejectors. Upon the top portion or cover 40, provided with a tightly closing spout-valve 41, the solenoid operated air compressor is mounted.

The principle parts of this solenoid operated air compressor comprise a solenoid 42 wound around a non magnetic metallic tube 43 inside of which a stationarily arranged magnetic plug 44, and a movably arranged magnetic plunger 45 are located. A magnetic frame 46 completes the magnetic circuit. Plunger 45 is provided with a centrally located hole 47, serving the purpose of an air passage to compressor plunger 48, through tube 49. Ball type air valve 50 normally tends to close this passage, while a similar air valve 53 is provided in closing plug 52. Spring 54, located within the compressor chamber, normally pushes plunger 45 into its uppermost position. An electrical switch 55 (see contacts 16 in Fig. 1) operated by plunger 45, completes the electromagnetically operated air compressor arrangement.

Contactor 56 (see parts 17 and 32 in Fig. 1) may conveniently be located upon frame 46, as shown in Figure 2.

The internal pressure control arrangement comprising an electrical switch (see contacts 18 and 19 in Fig. 1) 57, operated by the spring actuated plunger 58, is conveniently located upon cover 40.

The lubricant supply control equipment comprising a float 59 operating switch 60 (see contacts 20 and 21 in Fig. 1) is also suitably mounted and held in position upon cover 40.

The electrical functioning of the device corresponds with the diagram shown in Figure 1.

The air supply for the compression chamber enters through perforations 61, in tube 43, and passing slots 62, of the switch operating button, into hole 47, over valve 50 into the compressor chamber, from which it is forced out over valve 53 into container or tank 39.

The lower part of container 39 is closed by a, in this case specially designed, bottom part 63, forming one unit with the mechanical ejectors 63a, 63b, and 63c. These ejectors are composed of a lubricant feed tube 64, in communication with container 39, a sleeve valve 65 slidingly arranged upon tube 64 a plunger 68, and operating spring 66. Sleeve valve 65 is actuated by prongs 67 forming part of plunger 68.

Ejector 63a indicates the position of plunger and sleeve valve after the lubricant is ejected, in which position sleeve valve 65 is forced into its lowermost position by plunger 65, thereby permitting the entrance of the lubricant through the now corresponding perforations in tube 64 and sleeve valve 65. The entering lubricant gradually forces plunger 68 upward, whereby prongs 67 engage the flange of sleeve valve 65, and forcing the same upward till the uppermost position is reached, at which moment feed opening of tube 64 will be fully closed and the supply of lubricant effectively checked. This condition is clearly illustrated in ejector 63c. Spring 66 will now expand and force the lubricant into the lubricating point. These ejectors will automatically continue to function as long as the pressure within the container is maintained.

Figure 3:
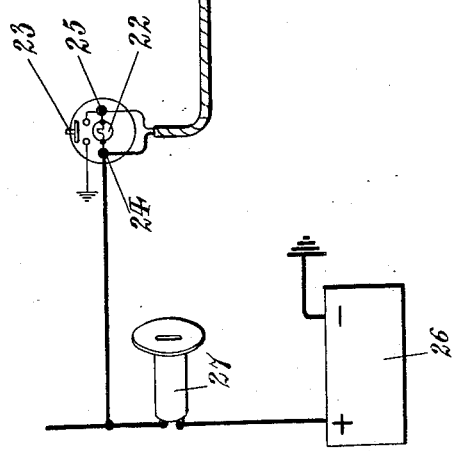
Figure 3, represents a partly sectional view of the automatic lubricant ejector and its connection to a lubricating point.
Figure 3:
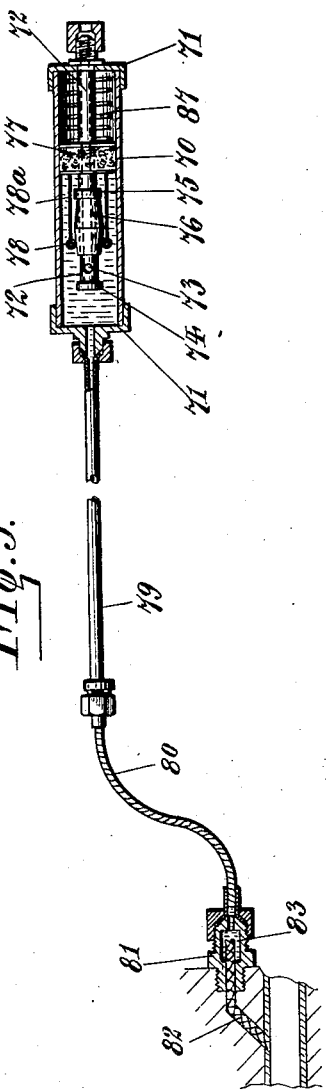

It is not entirely necessary that the ejectors form one unit with the container, as a matter of fact in most cases it will be of advantage to locate the ejectors at or near the lubricating points as shown in Figure 3. This type of ejector comprises a preferably tubular container 70, closed at either end by a cap 71 forming a union connector for the supply and feed tubes. A centrally located tubular stem 72 upon which a double cone shaped sleeve 76 is slidingly arranged and whose motions are limited by a lower stop collar 74 and an upper stop collar 75. A plunger 77, also slidingly arranged upon tubular stem 72, carries two rollers 78, held and actuated by springs 78a, permanently positioned upon plunger 77. With this roller arrangement sleeve 76 will either snap downward and close feed opening 73, when plunger is in the up position, or snap upward when the plunger is in the down position, and thus open perforation 73.

In Figure 3 the ejector is being shown in the process of being charged with lubricant. The lubricant entering at opening 73 will force plunger 77 backward against spring 87, till rollers 78, carried along by springs 78a, pass over the largest portion of sleeve 76, at which moment the spring pressure upon rollers 78 will cause sleeve 76 to snap forward against stop 74, thereby closing opening 73 and cutting off any further supply of lubricant. Now spring 87 by pressing against plunger 77, will gradually force the lubricant out of the ejector and into the lubricating point 81 till rollers 78 again are passing over the largest portion of the double cone shaped sleeve 76 causing the same to snap backward against stop 75, thereby clearing opening 73 for the process of charging as indicated in Figure 3.

Supply pipe 79 is connected to lubricating point 81, by means of a flexible tubing 80. Lubricating point 81 may advantageously be provided with a small reservoir 83, from which a suitable wick will lead into the lubricating surface.

To prevent any foreign matter from entering ejectors and lubricating points a filter screen 83, and individual filter screens 84, as shown in Figure 2, should be provided.

Plugs 85 serve the important purpose of draining and cleaning the container and ejectors.

The complete device may be mounted in any suitable manner and location. In Figure 2 a U-bolt 91 and clamp 92, securely fasten the device upon the chassis 93 of an automobile.

Protecting cover 94, is provided to protect the operating mechanism and permit the inspection of same.

Having thus fully disclosed my invention, I do not wish to limit myself to the exact construction as shown, it being apparent that there may be considerable variations in utilizing the principles disclosed without departing from the spirit of my invention.

What I claim and desire to secure by Letters Patent is:

1. In a lubricating system, a container, a lubricant within said container, and a suitably arranged electromagnetically operated and electrically controlled air pressure pump, for the purpose of maintaining a predetermined range of air pressure upon said lubricant, and suitable lubricant ejector means to supply a plurality of lubricating points.

2. In a lubricating system, a container, a lubricant enclosed within said container, a suitable electromagnetically operated and electrically controlled air pressure pump, and suitably arranged air pressure operated and electrical control means for the purpose of maintaining a predetermined range of air pressure within said container and upon said lubricant, and suitable lubricant ejector means to supply a plurality of lubricating points.

3. In a lubricating system, a container, a lubricant enclosed within said container, a suitable electromagnetically operated and electrically controlled air pressure pump, suitable air pressure operated regulating means, and suitably arranged and electrically controlled indicating and signalling means to function in case said air pressure within said container should reach a predetermined low value.

4. In a lubricating system, a container, a lubricant enclosed within said container, a suitable electromagnetically operated and electrically controlled air pressure pump, suitable air pressure operated regulating means, and suitably arranged remotely located and electrically controlled indicating and signalling means to function in case the predetermined low pressure limit within said container is reached.

5. In a lubricating system, a container, a quantity of lubricant within said container, an electromagnetically operated air pressure pump, air pressure operated regulating means, suitably arranged remotely located electrically controlled low pressure and minimum quantity of lubricant signalling means, and suitably arranged lubricant ejecting means operated and caused to function by said air pressure upon said lubricant within said container.

6. In a lubricating system, a container, a quantity of lubricant within said container, air pressure maintained within said container and directly upon said lubricant, electromagnetically operated air compressor for the purpose of maintaining said air pressure within said container, suitable air pressure regulating means, suitable lubricant level indicating means, and a plurality of suitably arranged lubricant ejecting means, said lubricant ejecting means perpetually operated and caused to function by the lubricant being forced into the lubricant ejecting means by said air pressure upon the lubricant within said container.

7. In an automatic lubricating system of the character described, the combination of a suitably arranged common container, a quantity of lubricant within said container, a plurality of remotely located lubricant ejectors, said lubricant ejectors fed and controlled by said common lubricant container, suitable electromagnetically air compressor means for the purpose of maintaining a predetermined value of air pressure within said common container, electrically actuated air pressure control means to control and regulate said air pressure within said container, float operated and electrically controlled lubricant quantity indicating means, suitable remotely located electrically controled signalling means for the purpose of signaling the minimum air pressure and also the minimum quantity of lubricant within said container and suitable electrical power operating and interconnecting means for the purpose of operating and functioning the said electrical air pressure maintaining control and signalling means, substantially as and for the purpose described.

8. In an automatic air pressure operated lubricating system of the character described, the combination of an electromagnetically controlled air compressor member, an electrical air pressure control member, a float operated electrical contact member, an electrical signalling member, and all of said electrical members so co-functioning with each other as to automatically operate and maintain the predetermined value of air pressure required to operate said lubricating system, substantially as and for the purpose described.

9. In a lubricating system of the character described, a container, a quantity of lubricant within said container and an electromagnetically controlled air compressor forming an integral member of said container comprising a suitably arranged magnetic frame, a preferably centrally located non-magnetic tube within said magnetic frame, an electrically controlled solenoid suitably located within said magnetic frame and upon said non-magnetic tube, a stationary magnetic plug and a movable magnetic plunger suitably located within said non magnetic tube, and a valve controlled air compressor also located within said non-magnetic tube, said air compressor so arranged as to mechanically connect to said movable magnetic plunger, and said magnetic plunger actuated and to operate said air compressor by the magnetic action of the electrical solenoid upon said magnetic plunger, substantially as and for the purpose set forth.

10. In a lubricating system of the character described, a container, a quantity of lubricant within said container and an electromagnetically controlled air compressor forming an integral member of said container comprising a tubular member, a suitably arranged air compressing member slidingly arranged within said tubular member, a suitable stationary closing member so located as to provide a suitable air chamber within said tubular member, a suitably arranged pressure operated air valve within said air compressing member, a suitably arranged pressure operated air valve within said stationary closing member, said air valves so arranged as to simultaneously operate when said air compressing member is actuated by the magnetic plunger of an electrically controlled solenoid, substantially as and for the purpose described.

11. In a lubricating system of the character described, a lubricant ejector comprising a suitable lubricant container, charge and discharge openings provided for said container, a centrally located tubular stem, said tubular stem so arranged as to form an inlet for the lubricant, a suitable quick acting opening and closing valve slidingly arranged upon said tubular stem, a suitable plunger also slidingly arranged upon said tubular stem, a suitable compressing spring to operate said plunger and intermediate operating means to actuate said quick acting valve, said operating means rigidly connected and forming part of said plunger, substantially as and for the purpose described.

Signed at the city of New York, in the county of New York and State of New York, this 25th day of August, A. D., 1926.

JOSEPH AMON.